Patented Jan. 1, 1952

2,580,997

UNITED STATES PATENT OFFICE 2,580,997

PLASTICIZED COPOLYMERS OF ACRYLONITRILE AND STYRENE

Earl C. Chapin, Dayton, Ohio, assignor to Monsanto Chemical Company, St. Louis, Mo., a corporation of Delaware No Drawing. Application September 18, 1948, Serial No. 49,999

8 Claims. (Cl. 260—31.8)

This invention relates to new, resinous compositions having high impact strengths and unusual adaptability to injection molding techniques. More specifically the invention relates to copolymers of styrene and acrylonitrile suitably plasticized to give unusually tough compositions without sacrificing any of the desirable properties of polystyrene.

Copolymers of styrene and acrylonitrile, and methods for their preparation by emulsion polymerization, wherein the premixed monomers are added to the polymerization mass throughout the reaction, at a rate which permits the maintenance of a constant reflux temperature, are described and claimed in copending application, Serial No. 5,483, filed January 28, 1948, now U. S. Patent 2,559,155, by Earl C. Chapin and George E. Ham. The said filed application describes clear, moldable copolymers having unusual resistance to organic solvents, but which occasionally do not have a desirable high impact strength.

The primary purpose of this application is to provide methods of improving the impact strength of copolymers of acrylonitrile and styrene. A further purpose of this invention is to provide a means of plasticizing copolymers of acrylonitrile and styrene without sacrifice of the desirable transparency. A further purpose of the invention is to prepare a new and more useful composition of matter.

It has been found that esters of phthalyl glycolic acid, wherein the ester group contains an alkyl radical containing one to four carbon atoms, are unusually compatible with copolymers of styrene and acrylonitrile, and develop unusually high impact strengths in the resulting composition. These plasticizers are not similarly useful with many other copolymeric compositions, and conversely other plasticizers do not produce the same result in copolymers of acrylonitrile and styrene. The invention is useful in copolymers of 30 to 75 per cent of styrene and 25 to 70 per cent of acrylonitrile, but the improvement is especially noticeable in copolymers of 40 to 70 per cent of styrene and 30 to 60 per cent of acrylonitrile. To achieve the beneficial result, it is necessary to use from 2 to 15 per cent of the plasticizer and for optimum results 5 to 12 per cent should be used.

The useful plasticizers for the practice of this invention are the phthalyl glycolic acid esters having the structural formula:

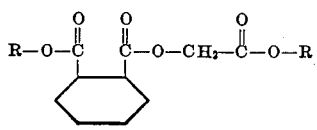

wherein R is an alkyl radical having from one to four carbon atoms, including methyl, ethyl, isopropyl, n-propyl, n-butyl, and isobutyl radicals.

The new plasticized copolymers are prepared by mixing the desired plasticizer and copolymer in any of the conventional mixing machines, for example, roll mills, Banbury type mixers, Throppe rolls, and dough mixers, which may be heated to soften the copolymers. The quantity of plasticizer used will depend upon the ultimate use of the composition, but in general the defined ranges will be found to produce a desirable result. The optimum proportion may readily be determined by preparing test samples and measuring the impact strengths and other desired physical properties.

The new compositions are unusually valuable for making injection molded articles which are to be subjected to severe strain or shock. Molded shapes with metal cores or inserts can be readily prepared with unusual effectiveness.

Further details of the preparation and evaluation of the new products are set forth with respect to the following specific examples:

Example 1

A 5-liter, 3-necked flask, provided with a mechanical stirrer, a reflux condenser, and a thermometer, was charged with two liters of distilled water and 2 grams of the sodium salt of di-2-ethylhexylsulfosuccinate. The contents of the flask were heated to 80° C. and a previously prepared solution of 400 grams of styrene, 600 grams of acrylonitrile, 2 grams of the sodium salt of di-2-ethylhexylsulfosuccinate, and one gram of tert.-dodecylmercaptan, was added dropwise to the flask at such a rate that the temperature was maintained between 80° C. and 85° C., the addition requiring approximately four hours. At the outset of the reaction, 50 cc. of one per cent aqueous potassium persulfate was added. Other 50 cc. portions of one per cent aqueous potassium persulfate solution were added after one, two and three hours of the reaction. After all of the mixed monomers had been added, the polymerization was immediately interrupted and the unreacted monomers removed by rapid steam distillation. The polymer emulsion was then dried directly.

The resin sample was divided into three parts and milled individually on Throppe rolls using 5 and 10 per cent of ethyl phthalyl ethylglycolate, the third sample being used as a control. The samples were molded to form test specimens and the impact strengths were measured on the Izod impact tester. The unplasticized sample had an unnotched impact strength of less than 5 foot pounds per inch, whereas the sample with 5 per cent plasticizer had an impact strength of 15.4 foot pounds per inch, and the 10 per cent plasticized sample had an impact strength of 12.0 foot pounds per inch. The unplasticized sample could not be injection molded in a Watson-Stillman one ounce injection molding machine; however, the plasticized samples were readily molded.

Example 2

Using the procedure described in the preceding example, 700 grams of styrene and 300 grams of acrylonitrile were polymerized in the presence of one gram of tert.-dodecyl mercaptan, 2 grams of the sodium salt of 2-ethylhexylsulfosuccinate, 200 cc. of one per cent potassium persulfate solution (added in increments during the reaction) and 0.3 gram of sodium meta-bisulfite. Six hours were required to complete the reaction at a reflux temperature of 75° C.

The resin was recovered by the method described in the preceding example and then compounded with 5 and 10 per cent of methyl phthalyl ethylglycolate. The following table sets forth the impact strength measured by both the notched and unnotched Izod methods:

| Per Cent Plasticizer | Notched Izod ft. lbs. per inch | Unnotched Izod ft. lbs. per inch |
|---|---|---|
| 0 | 5.5 | 0.30 |
| 5 | 7.9 | 0.60 |
| 10 | 7.7 | 0.58 |

The invention is defined by the following claims:

1. A copolymer of 30 to 75 per cent styrene and 25 to 70 per cent of acrylonitrile, containing intimately dispersed therein from 2 to 15 per cent of an ester having the structural formula:

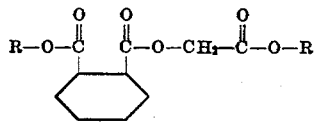

wherein R is an alkyl radical having from one to four carbon atoms.

2. A copolymer of 40 to 70 per cent styrene and 30 to 60 per cent acrylonitrile, containing intimately dispersed therein from 5 to 12 per cent of the ester having the structural formula:

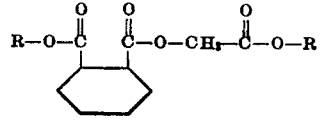

wherein R is an alkyl radical having from one to four carbon atoms.

3. A copolymer of 30 to 75 per cent styrene and 25 to 70 per cent of acrylonitrile, containing intimately dispersed therein from 2 to 15 per cent of ethyl phthalyl ethylglycolate.

4. A copolymer of 40 to 70 per cent styrene and 30 to 60 per cent acrylonitrile, containing intimately dispersed therein from 5 to 12 per cent of ethyl phthalyl ethylglycolate.

5. A copolymer of 30 to 75 per cent styrene and 25 to 70 per cent of acrylonitrile, containing intimately dispersed therein from 2 to 15 per cent of methyl phthayl ethylglycolate.

6. A copolymer of 40 to 70 per cent styrene and 30 to 60 per cent acrylonitrile, containing intimately dispersed therein from 5 to 12 per cent of methyl phthayl ethylglycolate.

7. A copolymer of 30 to 75 per cent styrene and 25 to 70 per cent of acrylonitrile, containing intimately dispersed therein from 2 to 15 per cent of methyl phthalyl methylglycolate.

8. A copolymer of 40 to 70 per cent styrene and 30 to 60 per cent acrylonitrile, containing intimately dispersed therein from 5 to 12 per cent of methyl phthalyl methylglycolate.

EARL C. CHAPIN.

REFERENCES CITED

The following references are of record in the file of this patent:

UNITED STATES PATENTS

| Number | Name | Date |
|---|---|---|
| 2,073,938 | Kyrides | Mar. 16, 1937 |
| 2,140,048 | Fikentscher et al. | Dec. 13, 1938 |
| 2,420,330 | Shriver et al. | May 13, 1947 |
| 2,437,966 | Mowry | Mar. 16, 1948 |